June 24, 1930. T. P. CHASE . 1,768,508
CONNECTING ROD
Filed Dec. 6 1928
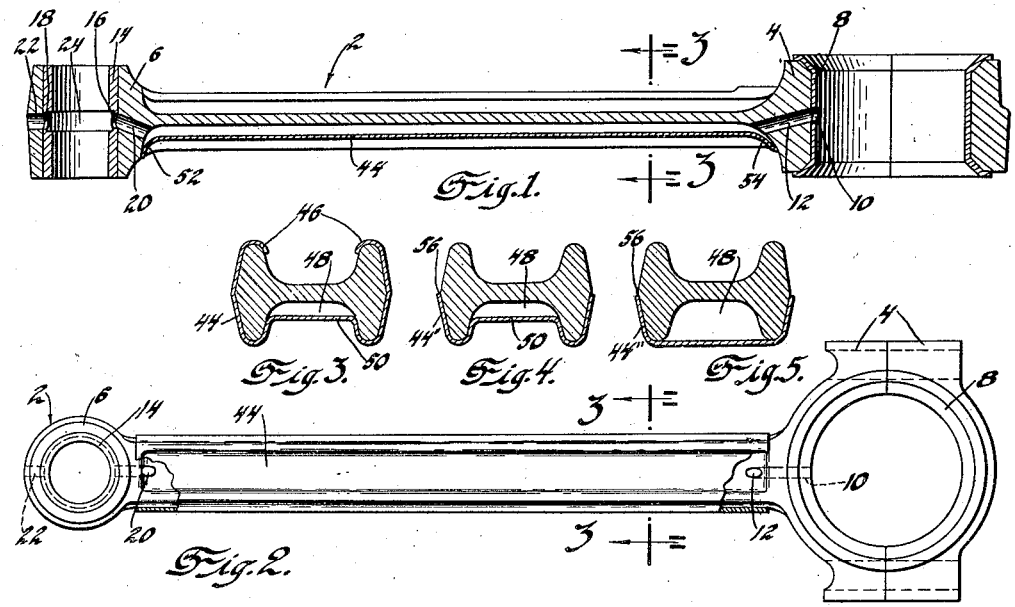
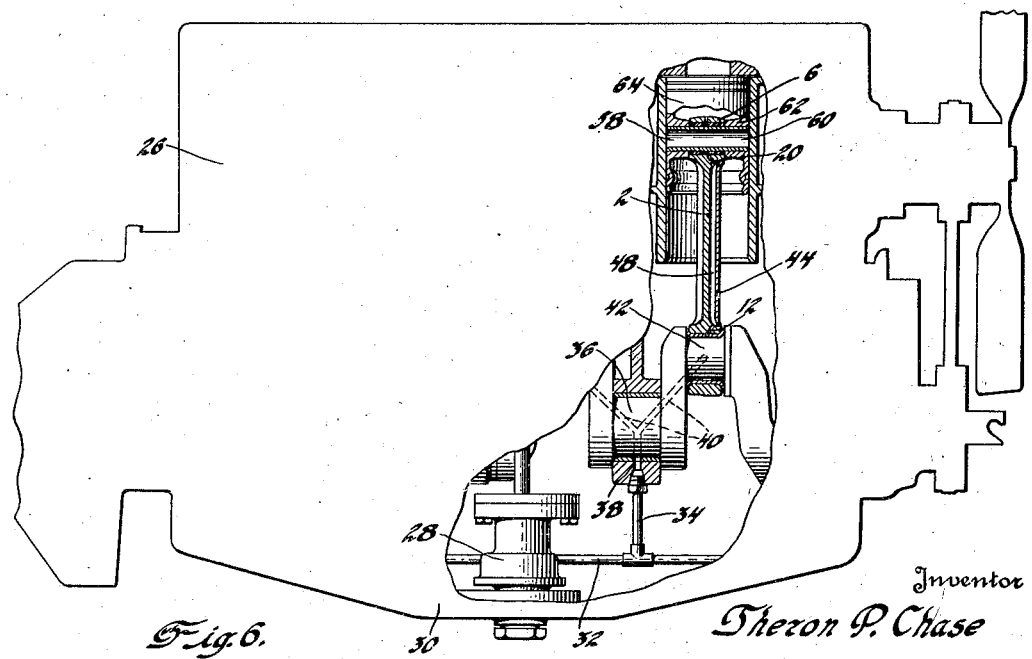
Inventor
Theron P. Chase
By Blackmore, Spencer & Fish
Attorneys Patented June 24, 1930

1,768,508

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

CONNECTING ROD

Application filed December 6, 1928. Serial No. 324,281.

This invention relates to lubricating systems and has particular application to the lubrication of the bearing parts of internal combustion engines used on automotive vehicles.

It is common practice today to lubricate the piston pin bearings by means of a lubricant passage or a pipe which conducts oil from the crank pin to the piston pin. This passage is usually formed in the center of the connecting rod, or the pipe is externally applied and leads the oil from the crank pin bearing to the piston pin bearing. Both of these methods while successful are somewhat expensive and it is the object of the present invention to form or build a lubricant channel which will conduct the oil to the piston pin bearing and which will be less expensive, much easier to construct and a great deal simpler than prior constructions.

The invention while illustrated as applied to the connecting rod of an internal combustion engine is nevertheless applicable to other parts of the engine for conducting lubricant to the bearing part.

The object of the invention is accomplished by using a flat plate or shell and applying this shell around the I-shaped portion of the connecting rod of an internal combustion engine. In applying the shell, a channel or passage is left between the shell and the I-shaped portion which channel or passage serves to conduct the oil from one end of the rod to the other. In applying the shell the ends thereof may extend entirely around the connecting rod and be clamped or pressed around the opposite side of the I-section or if desired a shorter shell or plate may be used and the sides secured to the connecting rod by welding or soldering. If desired the shell may be inwardly pressed toward the web of the I to form a smaller channel.

On the drawing:

Fig. 1 shows a sectional view through a connecting rod constructed in accordance with the invention.

Fig. 2 is a side view of the structure of Fig. 1 with parts broken away for purposes of clearer illustration.

Fig. 3 is a section on the line 3—3 of Figs. 1 and 2.

Figs. 4 and 5 are views similar to Fig. 3 of modifications.

Fig. 6 shows the novel connecting rod applied to the lubricating system of an internal combustion engine.

Referring to the drawing the numeral 2 indicates the connecting rod to which the invention is applied. The connecting rod is provided with the usual crank pin bearing end 4 and the piston pin bearing end 6. The bearing end 4 is provided with the usual bushing 8 having a lubricant opening 10 conforming to a lubricant opening 12 drilled in the bearing end 4.

The piston bearing end 6 is provided with a bushing 14 which has the lubricant openings 16 and 18. The lubricant opening 16 conforms to an opening 20 in the bearing portion 6 while opening 18 conforms to an opening 22 in the extreme end of the connecting rod. If desired, the openings 18 and 22 may be omitted. A groove 24 on the inner circumference of the bearing 14 allows the oil to pass from the opening 20 around the piston pin and towards the opening 22.

The invention is particularly concerned with the means or the device for conducting the lubricant from the opening 12 to the opening 20. From an examination of Fig. 6 it will be seen that the internal combustion engine 26 is provided with the usual oil pump 28 which takes the oil from the oil pan or sump 30 and forces it to the manifold 32 from where it is distributed by means of the pipes 34 to the crank shaft bearings 36. By means of suitable grooves and channels 38 and 40, the lubricant is conducted to the crank pin bearing 42 and the connecting rod bearing 8. From the crank pin bearing 42 the lubricant is forced by the pressure in the lubricant system into the openings 10 and 12.

In order to form a suitable passage or conduit from the opening 12 to the opening 20 of the connecting rod, there is applied around the connecting rod a shell or plate 44 in the form of a strip of metal and which is preferably of a width to extend around the opposite sides of the channel portion as shown in Fig. 3, so that the edges may be bent around the ends of the I as shown at 46. The shell or plate 44 forms with the connecting rod a channel or passage 48 and in order to reduce the size of the channel or passage the central portion of the shell 44 is inwardly pressed as shown at 50. If desired, this inwardly pressed portion may be omitted.

The shell or plate 44 has its ends 52 and 54 outwardly pressed and when fitted into position form a tight joint with the rounded portions of the crank pin bearing end 4 and the piston pin bearing end 6. The shape of the ends 52 and 54, will, of course, depend upon the shape of the parts against which they must fit. In applying the shell or plate 44 no sealing operation is used, nor is the application of solder necessary. The plate is merely applied and the shell pressed into position. Some leakage may and probably will occur at either edges or ends of the shell or plate 44 but this is immaterial as there is always excess oil and the centrifugal force is more than enough to carry oil in excess to the piston pins.

Referring to the species of Fig. 4, it will be seen that it is in all respects similar to the species of Fig. 3, except that the shell 44' is shorter and terminates at substantially the mid portion of the connecting rod as shown at 56 where it is secured to the connecting rod, either by solder or welding at one or more points.

The species of Fig. 5 is in all respects similar to that shown in Fig. 4, except that the shell 44'' does not have the inwardly pressed portion 50.

By referring to Fig. 6, it will be seen that the oil after it is delivered to the crank pin bearings 42 will be forced through the opening 12 and into the channel 48 formed by the shell 44 and the web of the connecting rod 2. The channel 48 will deliver the oil to the opening 20 at the crank pin bearing end 6, from where it will be transmitted to the crank pin 58 by means of the groove 24. The piston pin ends 60 are rigidly connected to the stud portions 62 of the piston 64 and need no lubrication. If desired the pin 58 may be freely mounted and the lubricant conducted to the ends 60 by means of suitable channels provided in the bushing in the connecting rod and in the studs 62 of the piston 64, or in the piston pin.

While the invention is shown as applied to a piston it is also adaptable to the crank case or other parts where a channel or grooved formation is found.

I claim:

1. In a connecting rod having bearing portions, said rod having an I section between the bearing portions, and a strip of metal bent about said I-section to form a lubricant channel.

2. In a means for lubricating the piston pin bearing of an I-shaped connecting rod of a prime mover, oil holes in the crankshaft and piston pin bearings of said rod, and a shell or cover over one of the channels of the I-shaped rod forming a lubricant passage communicating at its ends with the said holes and having its edges or side portions bent or crimped around the other channel to rigidly hold the shell or cover on the connecting rod.

In testimony whereof I affix my signature.

THERON P. CHASE.